April 17, 1951 W. L. CARLSON ET AL 2,549,424

FILTER ELEMENT USEFUL IN RADIO CIRCUITS

Filed March 29, 1947 2 Sheets-Sheet 1

Inventor
Wendell L. Carlson
& Robert L. Harvey

By H. S. Grover

Attorney

April 17, 1951 W. L. CARLSON ET AL 2,549,424
FILTER ELEMENT USEFUL IN RADIO CIRCUITS
Filed March 29, 1947 2 Sheets-Sheet 2

Inventor
Wendell L. Carlson
& Robert L. Harvey
By H. S. Grover
Attorney

Patented Apr. 17, 1951 2,549,424

UNITED STATES PATENT OFFICE 2,549,424

FILTER ELEMENT USEFUL IN RADIO CIRCUITS

Wendell L. Carlson and Robert L. Harvey, Princeton, N. J., assignors to Radio Corporation of America, a corporation of Delaware Application March 29, 1947, Serial No. 738,166

7 Claims. (Cl. 178—44)

This invention relates to a new and useful filter element which is particularly adapted for high frequency radio circuits.

An object of this invention is to provide a useful type of circuit element which combines both an active capacitance and resistance, with low reactance path when used in high frequency circuits.

Another object of this invention is to provide a novel and improved filter element which is inexpensive to manufacture, space saving, and has improved electrical efficiency.

Another object of this invention is to provide a filter for use in a radio frequency circuit, which filter is composed of a ceramic element having a relatively high dielectric constant to form the capacitive element, and another ceramic composition element having a substantial amount of magnetite ($Fe_3O_4$) incorporated therein to provide the resistive element, the ceramic of the resistive element having a relatively low dielectric constant. The two ceramic elements are positioned above a mounting stud with interposed electrodes and multi-terminal elements to form a complete circuit filtering device.

This invention incorporates further improvements in small ceramic capacitors of the type disclosed in a patent application filed by Robert L. Harvey and Chandler Wentworth on April 3, 1946, under Serial No. 659,232, and an application filed on October 18, 1946, by Wendell L. Carlson and Robert L. Harvey, under Serial No. 704,016, now Patent No. 2,528,113, issued October 31, 1950.

The invention is illustrated by the accompanying drawings, in which.

Figures 1, 2, 2A, 3, 3A, 4, 5, 6, 7:
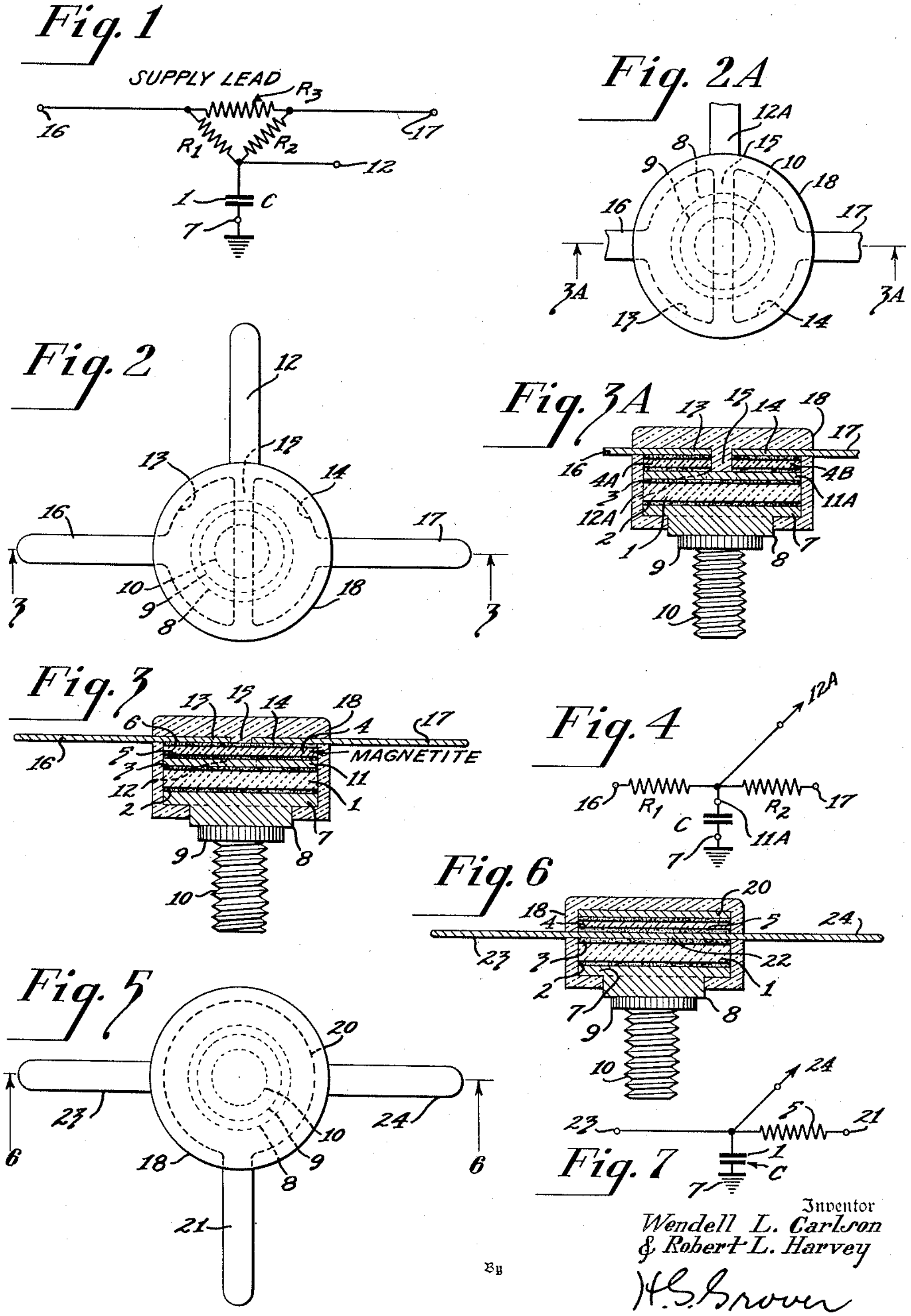
Fig. 1 is a schematic circuit diagram of the filter of this invention.
Fig. 2 is a plan view of the filter of this invention.
Fig. 2A is a modification of Fig. 2.
Fig. 3 is a cross-section of Fig. 2.
Fig. 3A is a modification of Fig. 3.
Fig. 4 is another schematic circuit diagram of the filter of this invention.
Fig. 5 is a plan view of a modified terminal construction of the device shown in Figs. 2 and 3.
Fig. 6 is a cross-section of Fig. 5.
Fig. 7 is a schematic diagram of the device shown by Figs. 5 and 6.

Referring now in detail to Figs. 1, 2 and 3 of the drawings, the capacitive dielectric element consists of a small, thin, ceramic disc 1 which is specially prepared by compressing ceramic powder of barium-strontium titinate mixed with one-half of one percent of methyl cellulose (400 cps.), the methyl cellulose acting as a temporary binder and lubricant. The use of a preferred ceramic powder having a percentage of barium titinate 69% $BaTiO_3$ and strontium titinate 31% $SrTiO_3$ is such as to give a high dielectric constant of about 5000 to 10,000 at room temperature. This combination of powder is compressed into small discs approximately three-eighths of an inch in diameter and twenty mils thick. The damp powder is placed in a hardened steel mold and pressed from both ends by a force of 7500 pounds. The discs are then fired in a furnace at 2450° F. and after cooling compose a ceramic body with a dielectric constant of about 5000.

After the discs have been fired, the heat is shut off and the discs are then slowly cooled within the oven; then they are coated on each side with a silver paste 2, 3 by any suitable means, such as by the silk screen method. Care should be taken not to have any of the paste cover any portion of the peripheral edge of the disc as such coating would reduce the voltage breakdown, and objectionable arcing would occur at this point. Disc 1 is again fired within an oven at a temperature of about 700° C. to convert the paste to form metallic silver electrodes for the capacitive element.

Figure 11:
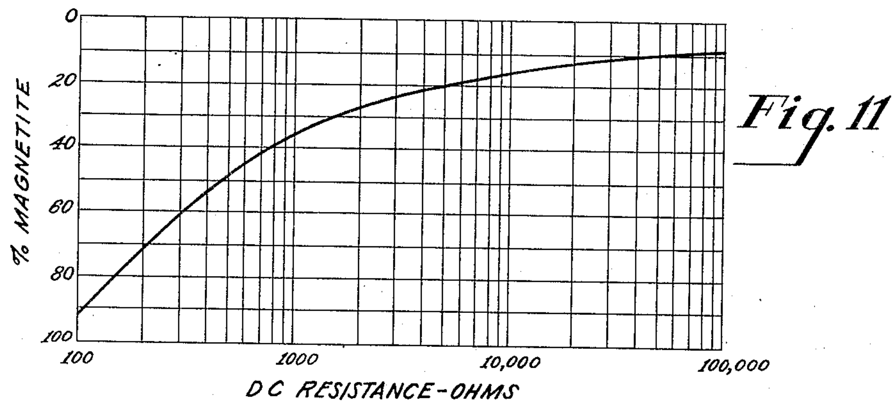
Fig. 11 is a graphic representation of the magnetite and ceramic mixtures to obtain different resistance values.

A resistive disc 4 of magnetite and ceramic powder is prepared in a somewhat similar manner to that of disc 1, except that in this instance we prefer to use a low dielectric constant ceramic, such as $TiO_2$, or $TiO_2$ and steatite. The ceramic resistance element 4 of low dielectric constant may be of any suitable composition of magnetite and ceramic powder. The percentage of magnetite added to the ceramic powder for a resistance range of 100 to 100,000 ohms is given by referring to the curve of the graph of Fig. 11. The low dielectric ceramic and magnetite powder disc is placed in a suitable mold in the same manner as described above for disc 1 and is also fired within an oven at substantially the same temperature as disc 1. After the disc 4 has been taken from the oven, it is coated with silver paste to form electrodes 5 and 6.

The filter mounting means comprises a knurled terminal stud portion 7 having its outer diameter substantially the same as that of the ceramic disc. A shouldered portion 8 is formed directly below the upper portion of the stud. A terminal portion 9 is located below the shouldered portion 8. A threaded portion 10 extends down from the knurled portion 9. The arrangement is such that the knurled portion 7 is driven into the mounting hole of a radio set chassis (not shown) and the terminal stud 7 is secured in operative position by means of suitable washers and nuts (not shown), the nuts being threaded onto the threaded portion 10. The terminal stud 7 serves as the grounding means for the filter element, and, in order to efficiently conduct the current the terminal and screw portion are silver plated. The upper portion of terminal stud 7 is soldered to electrode 2 of the ceramic disc 1.

Interposed between electrodes 3 and 5 is a circular terminal member 11 having an outwardly extending arm 12 integral therewith, this terminal member 11 serving as a common terminal for capacitive disc 1 and resistive disc 4. Secured and soldered to electrode 6 are two semi-circular terminal electrodes 13 and 14 which are spaced apart from each other a sufficient distance to provide the proper voltage path indicated at 15. The terminal electrodes 13 and 14 each have extending arms 16 and 17 to which suitable connections are made.

After the discs are assembled and the terminal members soldered to the electrodes, the unit is then vacuum impregnated to exclude moisture from the ceramic. A plastic encasement 18 is molded around the entire assembly to provide mechanical strength to hold the various elements together, and to further provide protection to the filter element as well as to improve the characteristic of the device. To further improve the device we prefer to mold a plastic case 18 on the assembly and then vacuum impregnate with wax at a temperature not exceeding 120° centrigrade.

As shown by the schematic diagram of Fig. 1, the ground is connected to terminal stud 7, the condenser is indicated by disc 1, the terminal arm 12 indicates the point to be by-passed, and the supply leads are connected at terminal arms 16 and 17. The resistance $R_1$ is that portion of disc 4 which is presented to terminals 16 and 12. The resistance $R_2$ is that portion of disc 4 which is presented to terminals 17 and 12. The resistance $R_3$ is that portion of disc 4 which is presented to terminals 16 and 17.

The schematic circuit diagram of Fig. 4 is somewhat similar to that of Fig. 1, except that the resistive disc element 4 is broken in two parts to form two semi-circular discs 4A and 4B, and insulatingly spaced apart as shown by Fig. 2A and Fig. 3A. The point to be filtered (indicated at 12A) is connected to a full circular terminal plate 11A located between the capacitive disc element 1 and the two semi-circular resistive discs. The condenser C is indicated by disc 1 having terminals 7 and 11A. The resistance $R_1$ is that portion of semi-circular disc 4A which is presented to terminals 11A and 16. The resistance $R_2$ is that portion of semi-circular disc 4B which is presented to terminals 11A and 17.

The filter elements shown by Figs. 5, 6 and 7 are similar to those mentioned above, except that the upper electrode 20 is not split but is a complete circle with an extending terminal arm 21. The intermediate terminal 22, which lies between electrodes 3 and 5, likewise comprises a complete circuit and has two extending arms 23, 24.

Fig. 7 is a schematic showing of the filter shown by Figs. 4 and 5. The point by-passed is representative of the terminal arm 24. The condenser C is representative of the ceramic disc 1. The ground terminal is representative of terminal stud 7. The input side of the filter is arm 23. The resistive element is disc 5. The output terminal is arm 21.

Figure 8:
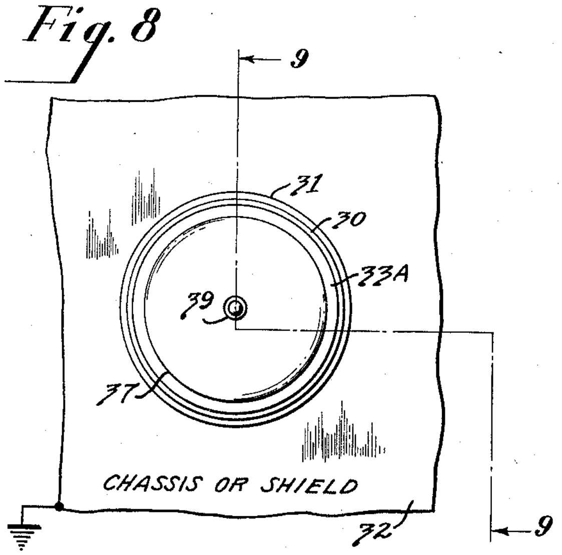
Fig. 8 is a plan view of a modified filter of the invention, wherein the capacitive element is in the shape of a hollow cylinder and the resistive element is in the form of a core within the cylinder.
Figure 9:
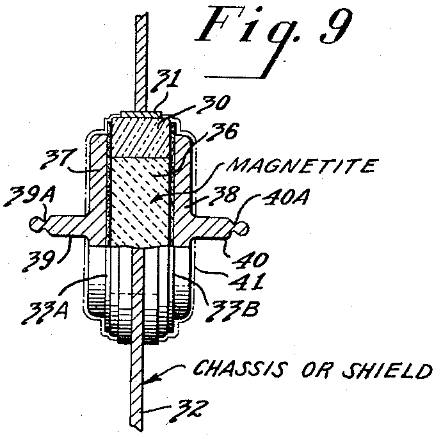
Fig. 9 is a cross-sectional view of Fig. 8, partly in elevation.
Figure 10:
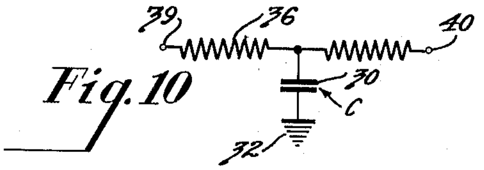
Fig. 10 is a schematic diagram of the filter device shown by Figs. 8 and 9.

The modification shown by Figs. 8, 9 and 10 is a feed-through filter element and includes a hollow cylindrical ceramic member 30 which is composed of barium-strontium titinate having a high dielectric constant of about 5000. A fired-on silver metallic ring 31 surrounds the outer periphery of member 30 and is centrally located thereon. In actual circuit use, this metal ring 31 is soldered into a suitable hole in the chassis or, for example, the shield 32 of a radio apparatus. This is the grounding means for the unit. Within the hollow portion of cylinder 30 there is located a core 36 containing magnetite and low dielectric constant ceramic, the ceramic having a low dielectric constant of 10–50. Both faces of the ceramic member 30 and resistive member 36 are coated with silver electrodes 33A and 33B to which are soldered the two terminals 37 and 38. The terminals 37 and 38 have connector studs 39 and 40. A groove 39A is provided for making connection with a wire (not shown) to stud 39, and a similar groove 40A is provided at the end of stud 40. After the entire condenser is assembled, it is dipped in a low loss phenolic varnish, as indicated by the broken lines 41, to prevent the entry of moisture. In order that connection can be made to members 31, 39A and 40A, the varnish should either be removed or this surface be covered before dipping.

Referring to the schematic circuit diagram of Fig. 10, the ground terminal (chassis or shield) is represented by 32, the condenser C is representative of ceramic member 30, the core 36 is the resistance, the input terminal is 39 and the output terminal is 40.

It will be noted that the filter elements referred to above are useful in radio frequency feed-through circuit applications because of the novel terminal construction; and, if desired, the ceramic filter elements may be of any other suitable size or shape.

What is claimed is:

1. An electric filter element comprising an electrically conductive terminal member having a plane surface, a ceramic capacitance plate having opposite electrically conductive surfaces and mounted with one of said surfaces in contact with said plane surface, a first electrically conducting terminal plate having one surface thereof in contact with the other of said capacitance plate surfaces and provided with an outwardly extending terminal lug, a ceramic resistance plate having opposite electrically conductive surfaces and mounted with one of said surfaces in contact with the other of said first terminal plate surfaces, and a second electrically conducting terminal plate having one surface thereof in contact with the other of said resistance plate surfaces and provided with an outwardly extending terminal lug.

2. An electric filter element comprising an electrically conductive terminal stud having an inner plate and a portion for attachment to a supporting structure, a ceramic capacitance plate having opposite surfaces of electrically conductive material and mounted with one of said surfaces in contact with said plate, a first electrically conducting terminal plate having one surface thereof in contact with the other of said capacitance plate surfaces and provided with a plurality of outwardly extending terminal lugs, a ceramic resistance plate having opposite surfaces of electrically conductive material and mounted with one of said surfaces in contact with the other of said first terminal plate surfaces, and a second electrically conducting terminal plate having one surface thereof in contact with the other of said resistance plate surfaces and provided with an outwardly extending terminal lug.

3. An electric filter element comprising an electrically conductive terminal stud having an inner plate and an outwardly extending portion for attachment to a supporting structure, a ceramic capacitance plate having opposite surfaces thereof conductively coated and mounted with one of said surfaces in intimate electrical and mechanical contact with said plate, a first electrically conducting terminal plate having one surface thereof in intimate electrical and mechanical contact with the other of said capacitance plate surfaces and provided with a pair of outwardly extending terminal lugs, a ceramic resistance plate having opposite surfaces thereof conductively coated and mounted with one of said surfaces in intimate electrical and mechanical contact with the other of said first terminal plate surfaces, and a second electrically conducting terminal plate having one surface thereof in intimate electrical and mechanical contact with the other of said resistance plate surfaces and provided with an outwardly extending terminal lug.

4. An electric filter element comprising an electrically conductive terminal member having a plane surface, a ceramic capacitance plate having opposite electrically conductive surfaces substantially coextensive with said plate and mounted with one of said surfaces in contact with said plate, a first electrically conducting terminal plate having one surface substantially coextensive with and in contact with the other of said capacitance plate surfaces and provided with an outwardly extending terminal, a ceramic resistance plate having one electrically conductive surface substantially coextensive with said first terminal plate mounted in contact with the other of said first terminal plate surfaces, and a plurality of mutually spaced electrically conductive surfaces disposed oppositely to said one conductive surface, and a plurality of second electrically conducting terminal plates each having one surface thereof in contact with one of said spaced resistance plate conductive surfaces and each being provided with an outwardly extending terminal, each of said spaced conductive surfaces and said corresponding second terminal plates having surface areas of smaller magnitude than the area of said one resistance plate conductive surface.

5. An electric filter element comprising an electrically conductive terminal stud having an inner plate and an outwardly extending portion for attachment to a supporting structure, a ceramic capacitance plate having opposite electrically conductive surfaces substantially coextensive with said plate and mounted with one of said surfaces in contact with said plate, a first electrically conducting terminal plate having one surface substantially coextensive with and in contact with the other of said capacitance plate surfaces and provided with an outwardly extending terminal lug, a ceramic resistance plate having opposite electrically conductive surfaces substantially coextensive with said first terminal plate mounted with one of said surfaces in contact with the other of said first terminal plate surfaces, and a pair of second electrically conducting terminal plates each having one surface thereof in contact with the other of said resistance plate surfaces and each being provided with an outwardly extending terminal lug, each of said second terminal plates having surface areas of smaller magnitude than the entire area of one of said resistance plate surfaces.

6. An electric filter element comprising an electrically conductive terminal member having a plane surface, a ceramic capacitance plate having opposite electrically conductive surfaces substantially coextensive with said plate and mounted with one of said surfaces in contact with said plate, a first electrically conducting terminal plate having one surface substantially coextensive with and in contact with the other of said capacitance plate surfaces and provided with an outwardly extending terminal, a plurality of mutually insulated ceramic resistance plates each having opposite electrically conductive surfaces which combined are substantially coextensive with said first terminal plate, said resistance plates being mounted with corresponding ones of said conductive surfaces in contact with the other of said first terminal plate surfaces, and a plurality of second electrically conducting terminal plates each having one surface thereof in contact with one of the other of said resistance plate conductive surfaces and each being provided with an outwardly extending terminal, each of said second terminal plates having surface areas of comparable magnitude to the conductive surface area of its associated one of said resistance plates.

7. An electric filter element comprising an electrically conductive terminal stud having an inner plate and an outwardly extending portion for attachment to a supporting structure, a ceramic capacitance plate having opposite electrically conductive surfaces substantially coextensive with said plate and mounted with one of said surfaces in contact with said plate, a first electrically conducting terminal plate having one surface substantially coextensive with and in contact with the other of said capacitance plate surfaces and provided with an outwardly extending terminal lug, a pair of mutually insulated ceramic resistance plates each having opposite electrically conductive surfaces which combined are substantially coextensive with said first terminal plate, said resistance plates being mounted with corresponding ones of said conductive surfaces in contact with the other of said first terminal plate surfaces, and a pair of second electrically conducting terminal plates each having one surface thereof in contact with one of the other of said resistance plate conductive surfaces and each being provided with an outwardly extending terminal lug, each of said second terminal plates having surface areas of comparable magnitude to the conductive surface area of its associated one of said resistance plates.

WENDELL L. CARLSON.
ROBERT L. HARVEY.

REFERENCES CITED

The following references are of record in the file of this patent:

UNITED STATES PATENTS

| Number | Name | Date |
|---|---|---|
| 1,563,754 | Latour | Dec. 1, 1925 |
| 1,833,867 | Houck | Nov. 24, 1931 |
| 2,111,710 | Van Loon | Mar. 26, 1938 |
| 2,283,925 | Harvey | May 26, 1942 |